(12) United States Patent  
Heidasch

(10) Patent No.: US 9,275,364 B2
(45) Date of Patent: Mar. 1, 2016

(54) SEMANTIC CONFIGURATION IN A BUSINESS PROCESS PLATFORM

(75) Inventor: Robert Heidasch, Speyer (DE)

(73) Assignee: SAP SE, Walldorf (DE)

( * ) Notice: Subject to any disclaimer, the term of this patent is extended or adjusted under 35 U.S.C. 154(b) by 602 days.

(21) Appl. No.: 13/287,745

(22) Filed: Nov. 2, 2011

(65) Prior Publication Data

US 2013/0110765 A1 May 2, 2013

(51) Int. Cl.
*G06F 7/00* (2006.01)
*G06F 17/30* (2006.01)
*G06Q 10/10* (2012.01)

(52) U.S. Cl.
CPC ............... *G06Q 10/10* (2013.01); *G06F 17/30* (2013.01)

(58) Field of Classification Search
CPC .............. G06F 17/218; G06F 11/3093; G06F 12/0646; G06F 17/3007; G06F 17/30; G06Q 10/10
See application file for complete search history.

(56) References Cited

U.S. PATENT DOCUMENTS

| 2008/0175263 | A1* | 7/2008 | Chen et al. | 370/431 |
| 2009/0328205 | A1* | 12/2009 | Ims et al. | 726/22 |
| 2010/0042450 | A1* | 2/2010 | Binswanger et al. | 705/7 |
| 2010/0222902 | A1* | 9/2010 | Eldridge et al. | 700/87 |
| 2012/0311105 | A1* | 12/2012 | Bijja | 709/220 |
| 2013/0073854 | A1* | 3/2013 | Patti et al. | 713/171 |
| 2013/0074063 | A1* | 3/2013 | Schwartz et al. | 717/174 |

* cited by examiner

*Primary Examiner* — Azam Cheema

(74) *Attorney, Agent, or Firm* — Schwegman Lundberg & Woessner, P.A.

(57) ABSTRACT

In an embodiment, a method is provided for customizing a task associated with a business process. In this method, a business process platform is accessed. The business process platform includes a business process definition and a provider semantic configuration. A group semantic configuration is generated, where the group semantic configuration extends the provider semantic configuration. A task defined in the business process definition is the customized based on the group semantic configuration.

21 Claims, 8 Drawing Sheets

SEMANTIC CONFIGURATION IN A BUSINESS PROCESS PLATFORM

FIELD

In an example embodiment, the present disclosure relates generally to facilitating the configuration of a business process.

BACKGROUND

Enterprises typically use business applications that execute on computer systems to perform a number of business functions (e.g., processing sales orders, approving business expenses, etc). These business applications generally involve the execution of a sequence of tasks using user interface (UI) elements (e.g., screens, wizards, etc.), business logic, and business data.

Due to the complex nature of business applications, enterprises normally purchase a business application system (referred herein as a "business process") from a third party (referred herein as a "business process provider") rather than developing them in-house. In such cases, a general business process may be developed by the business process provider that is targeted to enterprises with a diverse range of operational needs. Accordingly, after the business process is purchased, a particular enterprise may wish to customize the business process for the enterprise's particular needs. Customization of the business process usually costs the enterprise significant time and effort to modify the business process to meet the enterprise's specific business needs.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
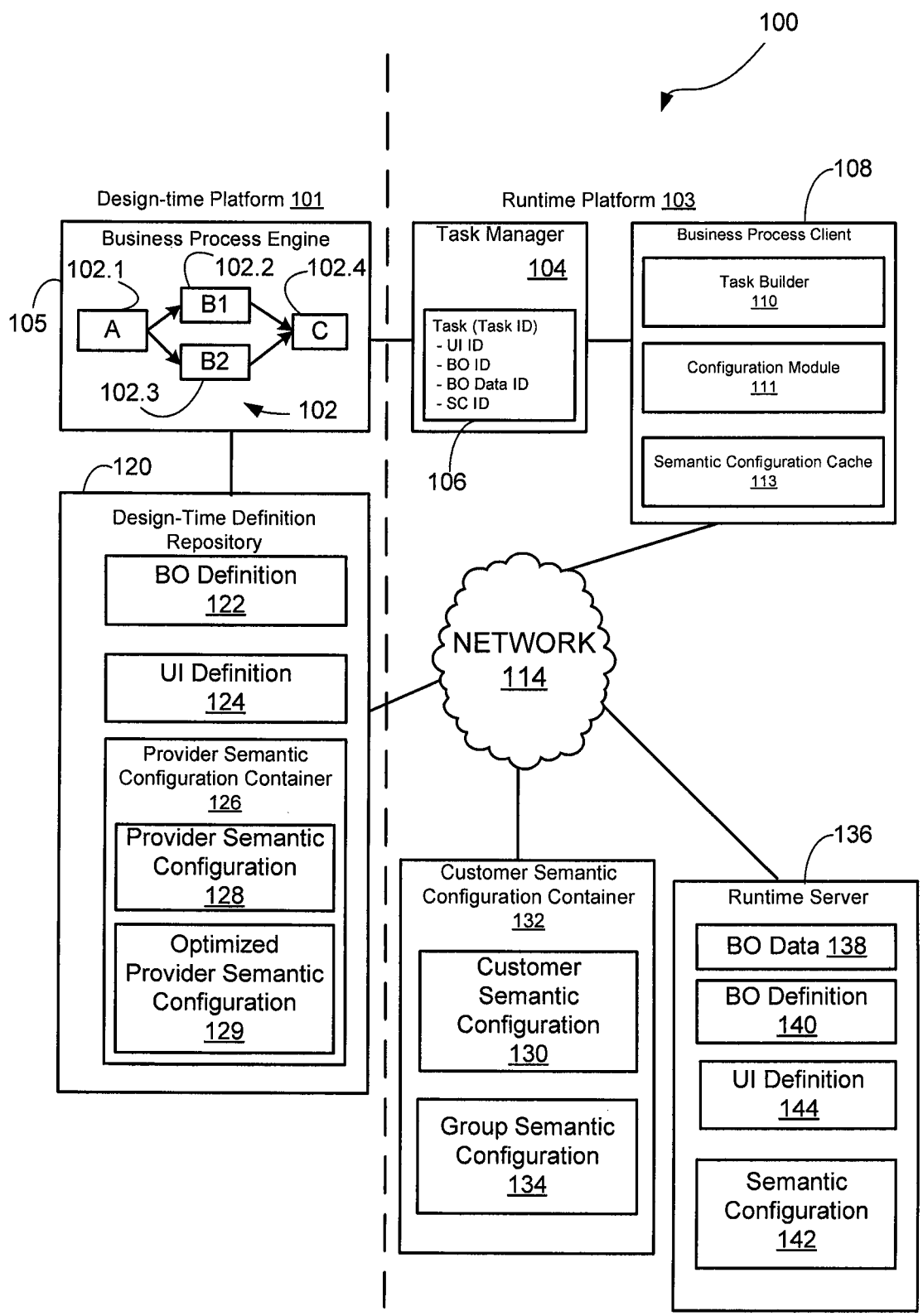
FIG. 1 is a block diagram depicting an architectural overview of a business process platform, in accordance with an example embodiment.

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

Prior to discussing specific example embodiments, further description of a "semantic configuration" is now provided for a better understanding of the descriptions set forth herein. A semantic configuration may be data that customizes a business process but is separate from the definition of the business process. As such, a semantic configuration may be orthogonal to the business process definition in that multiple semantic configurations may be developed to create different variants of the business process without having to modify the definition of the business process. In some embodiments, a semantic configuration may customize operational aspects of a business process, user interface (UI) elements, default values, and semantic values. Such customizations are described in greater detail below.

The embodiments described herein provide techniques for providing a business process platform that allows customers to customize business processes obtained from a business process supplier. As used herein, a "customer" may refer to a business or organization that performs business operations, in part, with a business process operated on a computer system. The business process platform may be a platform that contains various definitions used to generate an instance of the business process that is executed by the customer's system. A business process definition, UI definition, and business object definition are examples of definitions that a business process platform may include. In some embodiments, the business process definition, UI definition, and business object definition are not modifiable by the customer.

When the business process platform is deployed, the customer may generate semantic configurations that are used to generate a customized task from the business process definition, UI definition, and business object definition. In one example embodiment, the semantic configuration may be generated that customizes features of the business process for the customer. Such a semantic configuration may be referred to as a "customer semantic configuration." That is, a customer semantic configuration may customize the business process and corresponding tasks therein, to be coupled closer to the operations of a particular customer. In other example embodiments, the semantic configuration may be generated to customize a task for a group within the customer. Such a semantic configuration may be referred herein as a "group semantic configuration." The group semantic configuration may customize the business process and corresponding tasks therein, to be coupled closer to operations of a particular group within the organization customer.

FIG. 1 shows a business process platform 100. The business process platform 100 is a platform that is configured to provide customizable business process to a customer. As shown, the business process platform 100 includes a design-time platform 101 and a runtime platform 103. The design-time platform 101 may be configured to characterize the format, structure, semantic configurations prior to the execution of the business process. In some embodiments, the design-time platform 101 is created prior to the customer purchasing access to the business process platform 100. Accordingly, in some embodiments, the design-time platform 101 may be independent of a particular customer. The design-time platform 101 may be operated, performed, provided, or otherwise maintained by computer systems of a business process provider. As described above, a business process provider may refer to an entity that develops and offers business process platforms for sale or use to customers. A customer that purchases a business process may then have the business process platform 100, or portions thereof, deployed within the computer systems hosted by the customer. As used herein, "deploying" the business process platform 100 may refer to making components and modules of the business process platform 100 accessible to the computer systems hosted by the customer so that the customer may execute the business process. Deploying the business process platform 100 may involve installation of software, logic, hardware, or some combination thereof at the customer site. Deploying the business process platform 100 may also involve providing access to the functionality over a network (e.g., as a web service).

As FIG. 1 shows, the design-time platform 101 includes a business process engine 105 and a design-time definition repository 120. The business process engine 105 is a repository that stores a business process definition 102. A "business process definition," as used herein, may be a representation of the elements involved in the execution of the business process. Such elements may include a number of associations between business objects, tasks, UI, and any other business process element. In particular, as shown in FIG. 1, the business process definition 102 may model a business process as a workflow of dependant tasks 102.1-102.4. As will be discussed, each of the tasks 102.1-102.4 may be associated with UI definitions, business objects, business object definitions, and semantic configurations.

The design-time definition repository 120 is configured to store and provide access to elements of a business process, such as a business object definition 122, a UI definition 124, and a semantic configuration container 126, all of which may be usable by the business process designed in the business process engine 105. The business object definition 122 characterizes the structure of a business object, the states of a business object, operations of a business object (e.g. web services and semantic validation functions), and any other related data or functionality. In some embodiments, the business object definition 122 is compiled into an executable business object. The executable business object may be a ready-to-run business object, capable of operation in different runtime environments (e.g., an ADVANCE BUSINESS APPLICATION PROGRAMMING™ (ABAP) system, a JAVA VIRTUAL MACHINE™, or any other suitable runtime environments). FIG. 1 shows that the runtime server 136 of the runtime platform 103 stores the executable business object 138. In some embodiments, the executable business object 138 may provide functionality that supports the transfer of business data 138 from the runtime server 136 to the business process client 108.

The UI definition 124 may characterize a set of UI controls that are usable in completing the tasks 102.1-102.4 associated with a business process. Such controls may be used to build screens, wizards, or any other suitable UI. Examples of UI controls include buttons, menus, list boxes, text windows, dialog boxes, and the like.

The provider semantic configuration container 126 stores semantic configurations defined by the business process provider. The provider semantic configuration container 126 may be a data store (e.g., a database or collection of files in a file system) accessible by the customer. A semantic configuration customizes the various elements associated with a business processes. In some embodiments, a semantic configuration may be implemented as a file stored in any number of formats, such as, for example, extensible markup language (XML).

Figure 2:
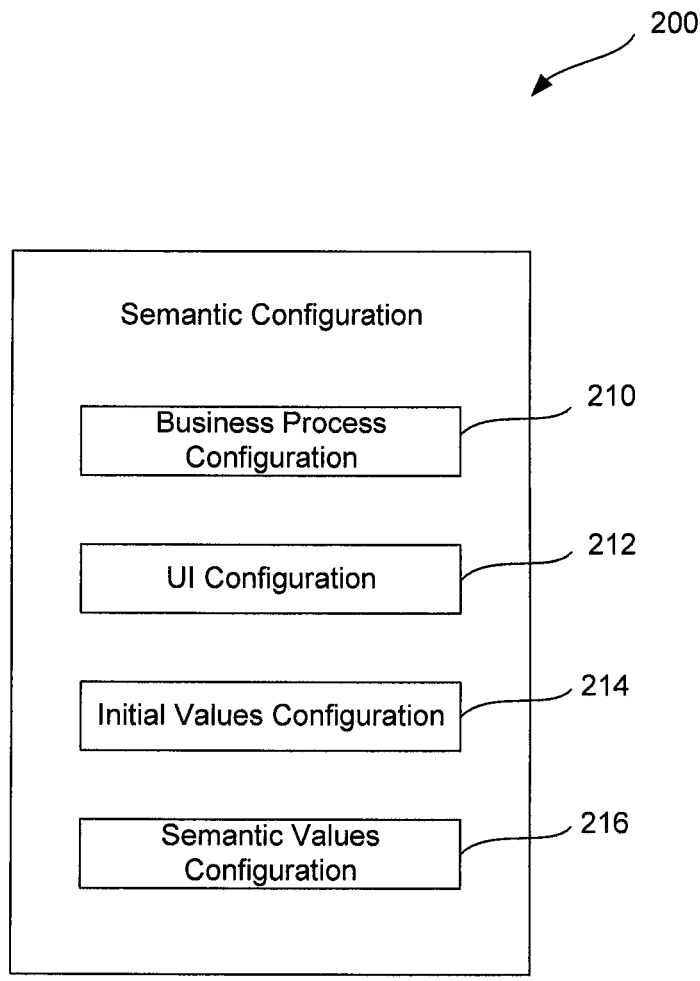
FIG. 2 is a block diagram that illustrates example configuration modules contained in a semantic configuration, in accordance with an example embodiment.

FIG. 2 is a block diagram that illustrates example configuration modules contained in a semantic configuration 200. In particular, the semantic configuration 200 may include a business process configuration module 210, a UI configuration module 212, an initial values configuration module 214, and a semantic values configuration module 216. It is to be appreciated that the semantic configuration 200 is described generically, which may be implemented any semantic configuration, such as semantic configurations 128, 129, 130, and 134, which are described in greater detail below.

The business process configuration module 210 may include semantic configuration values that define settings for elements of the business process definition 102, parameters used in the business process definition 102, and business process functionality and behaviors that can be used to define semantic meaning of the business process elements. For example, the business process configuration module 210 may contain a configurable condition that switches on or off some process steps in the execution of a task or business process. In this way, the configurable condition may be used to generate two variants of a business process (e.g., one that uses a particular step and another that does not use the particular step).

The UI configuration module 212 may define semantic configuration values associated with UI elements. For example, the UI configuration module 212 may include semantic configuration values that characterize whether a UI element is visible, modifiable, required, optional, dependent on other UI elements (e.g., whether an UI element receives input from another UI element), or any other suitable characterization of a UI element.

Initial values configuration module 214 may include semantic configuration values that characterize the settings of the business process that are automatically used during the execution of the business process. Such values may, for example, be automatically entered in UI controls. If the respective UI control is configured to be visible and modifiable, the business process may be configured to allow an end-user to modify the initial value. In some embodiments, the initial values configuration module 214 may include semantic configuration values that may be used in a customer system to set required and non-modifiable values. For example, the initial values configuration module 214 may contain a semantic value that is used to store a company code (e.g., an identifier associated with a particular company) in financial systems.

The semantic values configuration module 216 may define terminology that may be linked to particular UI controls. Accordingly, the semantic values configuration module 216 allows an end-user to modify the terminology used in executing elements of the business process. This terminology may then be used to allow improve UI interactions with the end-user. For example, the semantic values configuration module 216 may allow an end-user to use a voice recognizer to manipulate the UI with terminology determined by an enterprise or group.

With reference back to FIG. 1, the provider semantic configuration 128 is a semantic configuration that is generated by the business process provider as a ready to use semantic configuration.

As shown in FIG. 1, the provider semantic configuration container 126 may store any number of provider semantic configurations that are optimized for different domains or particular customers. This type of semantic configuration is shown as optimized provider semantic configuration 129. To illustrate, in some embodiments, the business process provider may provide a semantic configuration that optimizes the business process definition 102 to be suitable for a broad range of enterprises. In other embodiments, business process provider may provide semantic configurations that couple the business process definition 102 closer to a particular domain. For example, a business process a defense contractor uses to approve purchase orders may be well known but different than the general process other enterprises use to approve purchase orders. For example, a defense contractor may, in some cases, be limited to purchasing items or services from enterprises that possess a security clearance that authorizes the handling of confidential information of a particular country. Outside of the defense contractor domain, enterprises may not generally consider another company's security clearance in approving a purchase order.

In such cases where enterprises may differ based on a domain, the business process provider may then generate a provider semantic configuration optimized for a particular domain (e.g., defense contractor or military) and another provider semantic configuration that is domain specific or one that is directed to another domain (e.g., a automobile manufacturers).

As described above, the optimized provider semantic configuration 129, according to some embodiments, may be optimized for a specific customer. In such cases, the optimized provider semantic configuration 129 may extend an existing semantic configuration (e.g., the provider semantic configuration 128) or may be created independent of any existing semantic configuration. If the optimized provider semantic configuration 129 is created as an extension to the provider semantic configuration 128, for example, the respective relation between the semantic configurations is set in the optimized provider semantic configuration 129, the provider semantic configuration 128, or both the optimized provider semantic configuration 130 and the provider semantic configuration 128.

As used herein, where a semantic configuration "extends" another semantic configuration, the extending semantic configuration may inherit the semantic configuration values of the extended semantic configuration. Extending a semantic configuration may include indirect extensions. For example, where a first semantic configuration directly extends a second semantic configuration and the second semantic configuration directly extends a third semantic configuration, the first semantic configuration indirectly extends the third semantic configuration. In some embodiments, an extending semantic configuration may override, modify, delete, or add semantic configuration values set forth in the extended semantic configuration.

FIG. 1 shows that the business process platform 100 includes the design-time platform 101 and the runtime platform 103. As discussed above, the design-time platform 101 may include definitions and semantic configurations defined by a business process provider before the business process platform 100 is deployed. In comparison, the runtime platform 103 may include data, applications, software, hardware, logic, or any combination thereof implemented after the business process platform 100 is deployed to the customer. Therefore, the runtime platform 103 may include components that are specific to a business process platform that is accessible to a particular customer.

For example, after the business process platform 100 is deployed at the customer site, other types of semantic configurations may be created and stored in the customer semantic configuration container 132. The customer semantic configuration container 132 may be a data store (e.g., a database or collection of files in a file system) accessible by the customer.

FIG. 1 shows that the customer semantic configuration container 132 may store a customer semantic configuration 130 and a group semantic configuration 134. The customer semantic configuration 130 is similar to the optimized provider semantic configuration 129 optimized for a particular customer, as described above. However, the customer semantic configuration 130 may be defined by the customer after the business process platform 100 has been deployed. As such, the customer semantic configuration 130 may extend a semantic configuration stored in the provider semantic configuration container 126 to create a semantic configuration optimized for the customer as a whole.

The group semantic configuration 134 may provide semantic configuration changes to a semantic configuration that are specific to a group belonging to an enterprise, such as the customer. A "group," as used herein, may refer to one or more entities that share a common attribute, such as a department, unit, program, project, role, or any other suitable attribute. The group semantic configuration 134 may extend an existing semantic configuration (e.g., provider semantic configuration 128, the optimized provider semantic configuration 129, or the customer semantic configuration 130). When the group semantic configuration 134 extends another semantic configuration, the relationship may be indicated in either or both of the semantic configurations. In some embodiments, the group semantic configuration 134 may extend an existing semantic configuration to add semantic values to the existing semantic configuration that are used to assign terminology to specific UI control. As discussed above, this terminology facilitates UI interactions with the end-user using customized terminology. Such may be useful when integrating a UI with a voice recognizer.

Before the business process is executed, the semantic configurations 128, 129, 130, and 134 and the design-time definitions 122 and 124 are imported to the runtime server 136, as shown as business object definition 140 and UI definition 144. The runtime server 136 may be a computer system that manages business data that are accessible when the business process platform is executed. Accordingly, the runtime server 136 may provide persistence and versioning of the business object data 138, business object definition 140, the semantic configuration 142, and the UI definition 144.

At runtime, to execute a business process offered in a business process platform 100, the business process client 108 is made accessible to the customer site (e.g., installed on a computer system). The business process client 108 allows the end-user to connect to a task manager 104 to obtain a task descriptor 106 associated with a task of a business process. As shown in FIG. 1, the task descriptor 106 includes a UI identifier, a business object identifier, a business object data identifier, and a semantic configuration identifier. The task descriptor 106 is a used to obtain the elements associated with the respective task. In some embodiments, the business process client 108 automatically connects to the task manager 104 and obtains the elements associated with a task.

Still referring to FIG. 1, the business process client 108 includes a task builder 110. The task builder 110 allows for the creation and execution of a business task by a particular end-user. In some embodiments, the task builder 110 communicates through a network 114 (e.g., the Internet, a Wide Area Network (WAN) or a Local Area Network (LAN)) to receive elements needed to build a task. Once the task builder 110 receives the elements of the task, the task builder then provides a UI to the end-user so that the task may be completed.

Figure 3:
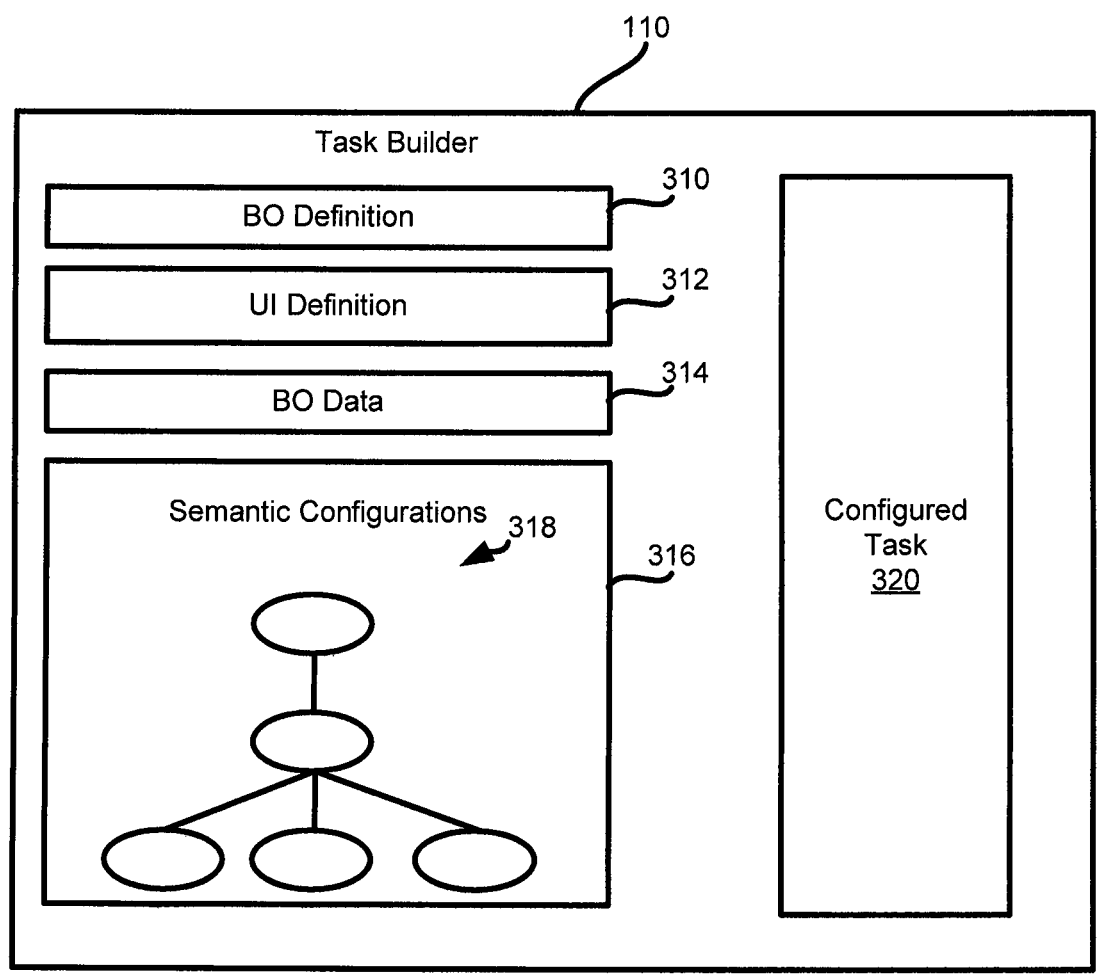
FIG. 3 is a block diagram that shows further details of an example task builder, in accordance with an embodiment.

FIG. 3 is a block diagram that shows the task builder 110 in greater detail. For example, the task builder 110 may merge a business object definition 310, a UI definition 312, business object data 314, and semantic configurations 316 to generate an optimized task optimized task 320. As will be explained below, the optimized task 320 may be generated after the task builder 110 applies the semantic configurations 316 to the business object definition 310, UI definition 312, business object data 314, and semantic configurations 316. Further, the task builder 110 receives the business object definition 310, UI definition 312, business object data 314, and semantic configurations from the runtime server 136 based on the elements identified in the task descriptor 106. In some cases, the task builder 110 utilizes a modular communication technique that decouples the transfer of data of a business object from the definition of the business object. UI definitions and semantic configurations are similarly decoupled. Thus, the task builder 110 is able to request a definition or semantic configuration if the task builder 110 doesn't already store such information. That is, the runtime server 136 separates the communication of the business object definition 310, UI definition 312, and the semantic configuration 314 from the business object data 314.

Figure 4:
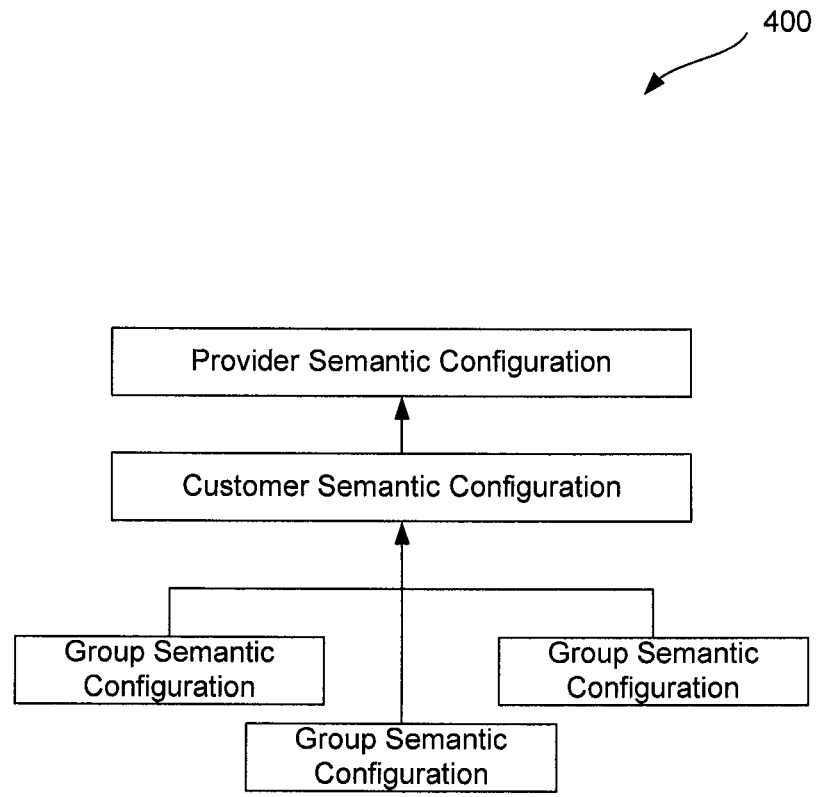
FIG. 4 shows an example of a semantic configuration hierarchy, in accordance with an embodiment.

FIG. 3 also shows that the semantic configurations 316 may be represented as a semantic configuration hierarchy 318. Such may be the case, as described above, where one semantic configuration extends another semantic configuration. FIG. 4 shows an example of a semantic configuration hierarchy 400 that may be maintained, for example, by the semantic configurations 316 of the task builder 110. The semantic configuration hierarchy 400 maintains relationships between semantic configurations. The semantic configuration relations are used then to determine a complete set of semantic configurations that are used by the business process client to build a final semantic configuration. The final semantic configuration may be the result of merging the set of semantic configurations. The final semantic configuration is used to personalize the business process for the end-user in a way that is optimized for a particular group.

In some embodiments, the task builder 110 uses merging rules to generate the final semantic configuration. For example, the task builder 110 may allow a provider semantic configuration to extend another provider semantic configuration. As another example, the task builder 110 may allow a customer semantic configuration to extend a provider semantic configuration or another customer semantic configuration. As yet another example, the task builder 110 may allow a group semantic configuration to extend a provider semantic configuration, customer semantic configuration, or another group semantic configuration.

With reference back to FIG. 1, the business process client 108 also includes a configuration module 111 and a semantic configuration cache 113. The configuration module 111 may provide an interface that allows a user to create, modify, or delete a semantic configuration.

The semantic configuration cache 113 is a repository that stores previously obtained semantic configurations. Storing semantic configurations in the semantic configuration cache 113 provides comparatively quick access to the stored semantic configuration. Further, by obtaining the semantic configurations through the semantic configuration cache 113, the business process client 108 may reduce the number of requests sent to the runtime server 136.

With reference to FIGS. 1-4, it should be appreciated that in other embodiments, the system 100 may include fewer or more components apart from those shown in the figures. For example, in an alternate embodiment, the task manager 104 may be integrated within the business process client 108. The components and respective modules shown in FIGS. 1-4 may be in the form of software that is processed by a processor. In another example, as explained in more detail below, the components and respective modules shown in FIGS. 1-4 may be in the form of firmware that is processed by application specific integrated circuits (ASIC), which may be integrated into a circuit board. Alternatively, the components and respective modules shown in FIGS. 1-4 may be in the form of one or more logic blocks included in a programmable logic device (for example, a field programmable gate array). The components and respective modules shown in FIGS. 1-4 may be adapted, and/or additional structures may be provided, to provide alternative or additional functionalities beyond those specifically discussed in reference to FIGS. 1-4. Examples of such alternative or additional functionalities will be discussed in reference to the flow diagrams discussed below.

Figure 5A:
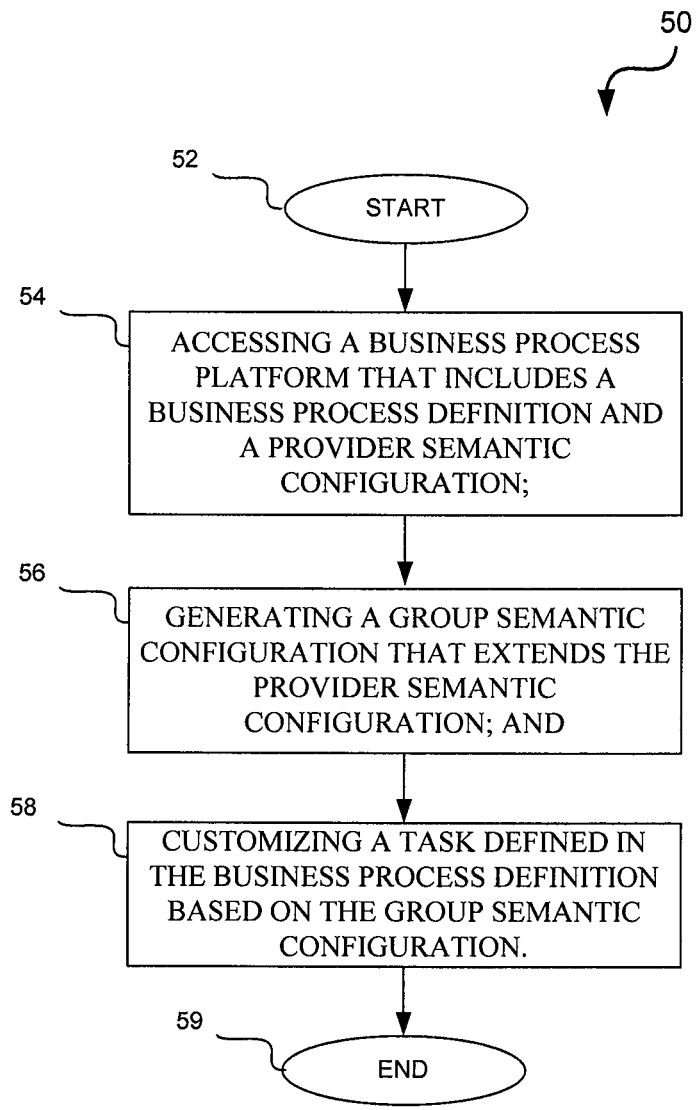
FIG. 5A depicts a flow diagram of a general overview of a method, in accordance with an embodiment, for customizing a task of a business process.

FIG. 5A depicts a flow diagram of a general overview of a method 50, in accordance with an embodiment, for customizing a task of a business process. Further details of the operations of the method 50 are set forth in the description corresponding to FIGS. 5B-5C. In an example embodiment, the method 50 may be implemented by the components of the design-time platform 101, the run-time platform 103, or a combination thereof.

According to FIG. 5A, the method 50 begins as operation 52. A business process platform that includes a business process definition and a provider semantic configuration is then accessed. This is shown as operation 54, which may occur after the business process platform is deployed at the customer site. In an example embodiment, the business process platform may be accessed by an end-user through the business process client 108.

At operation 56, a group semantic configuration is generated. The group semantic configuration may extend the provider semantic configuration to align a business process closer to the operations specifically performed by the customer. In some embodiments, the group semantic configuration may extend the provider semantic configuration through an intermediate semantic configuration.

At operation 58, a task defined in the business process definition is customized based on the group semantic configuration. For example, the task builder 110 may customize the business process definition based on the semantic configuration values stored in the group semantic configuration. For example, the task builder 110 may set default values, disable or enable particular steps of the task, assign terminology to UI controls, and the like. The method 50 then ends at operation 59.

Figure 5B:
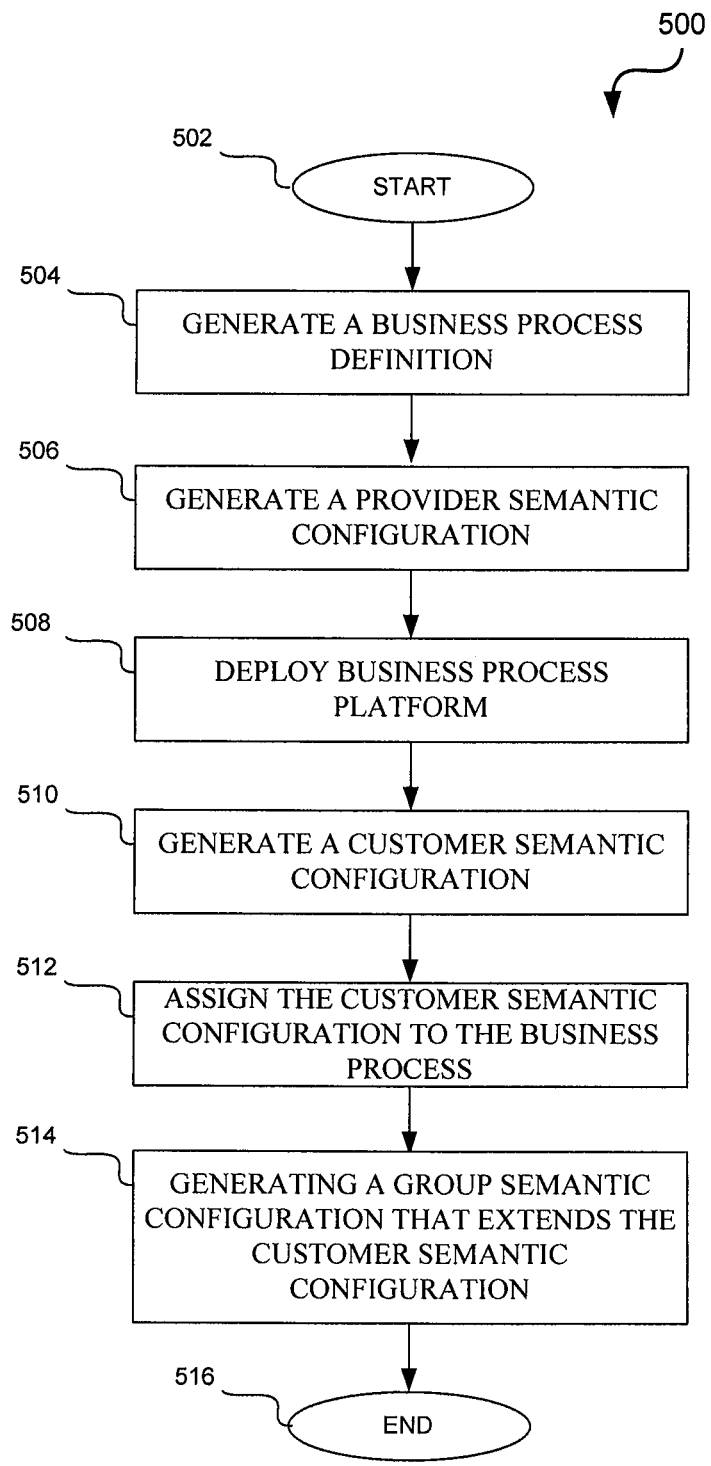
FIG. 5B depicts a flow diagram of a general overview of a method, in accordance with an embodiment, for deploying a semantically configurable business process platform.

FIG. 5B depicts a flow diagram of a general overview of a method 500, in accordance with an embodiment, for deploying a semantically configurable business process platform. In an example embodiment, the method 500 may be implemented by the components of the design-time platform 101, the run-time platform 103, or a combination thereof.

Referring to FIG. 5B, the method may begin at operation 502. Then, at operation 504, a business process provider may generate a business process definition. As described above, a business process definition may include a workflow of tasks. Each task may depend on UI elements and business objects. Accordingly, operation 504 may involve the business process provider generating definitions of the UI and the business objects involved in a business process and linking the business objects definition and UI definition to the corresponding tasks.

At operation 506, the business process provider may generate a provider semantic configuration. As described above, the business provider semantic configuration may include semantic configurations that form a base semantic configuration. That is, the business provider semantic configuration may be a semantic configuration that defines the settings, modifications, assignments of functionality, and any other configurable elements of business process that applies to a broad range of customers. In some embodiments, the business process provider may extend a general semantic configuration to be optimized for a particular domain or customer.

At operation 508, the business process platform is then deployed in the customer environment. Operation 508 may involve the customer installing software and computer systems within or communicatively coupling the business process provider to computer systems hosted by the customer. Once the business process platform is deployed, the customer may access to the business process through, for example, the business process client 108. However, at this point, the business process may operate according a semantic configuration defined by the provider semantic configuration. Accordingly, the business process may not be optimized for the specialized functions and needs of the customer. For example, the business process definition 102 may include a task that is not performed by the customer.

To better align the business process with the operations of the customer, a customer semantic configuration is generated. This is shown as operation 510. For example, a business process expert may access the business process platform 100 by executing the business process client 108 in configuration mode. The configuration mode causes the configuration module 111 to create or update a semantic configuration. In an example embodiment, the configuration module 111 may cause the customized semantic configuration to extend the semantic configurations set in the design-time platform 101, such as the provider semantic configuration 128 or the optimized semantic configuration 129. As such, the semantic configurations provided by the design-time platforms 101 may be used as base semantic configurations for the customized semantic configuration. The configuration module 111 may save the customized semantic configuration in the runtime server 136.

Although operation 510 has been described as being performed after deploying the business process platform at the customer environment, it is to be appreciated that operation 510 may be performed prior to the deployment. For example, the business process provider may perform operation 510 on behalf of the customer, where the semantic configuration is saved as the optimized provider semantic configuration 129.

At operation 512, the business process expert may assign the customer semantic configuration to the business process. Such an assignment may further assign the customer semantic configuration to a group. The assignment may contain assignment conditions that are used to determine what semantic configuration is to be used when a particular business process instance is performed by an end-user. For example, an end-user's role within a company may determine what semantic configuration is to be used when executing the specified business process.

At operation 514, the end-user may personalize the execution of the business process. For example, the end-user may operate the business process client 108 so that the configuration module 111 creates another semantic configuration, or updates an existing semantic configuration, to set different default values, semantic meaning, and conditions (e.g. if element A is set to a first value then element B is set to a second value). In this way, a group semantic configuration is generated. In some embodiments, when an end-user generates a group semantic configuration, the business process validates that a role associated with the end-user permits the end-user to set a semantic configuration for a group.

Figure 5C:
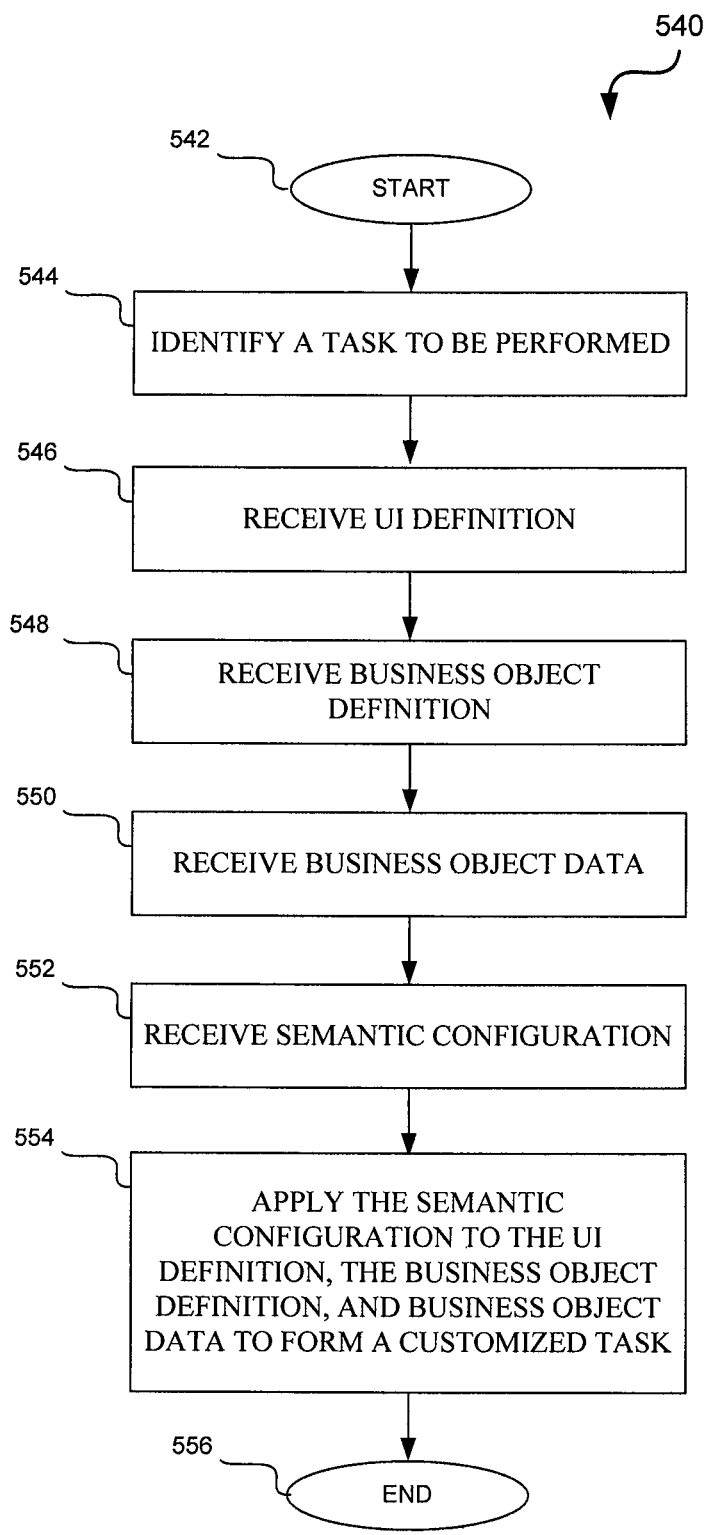
FIG. 5C is a flow diagram that shows a method for executing a customized business process, in accordance with an embodiment.

After the group semantic configuration is generated, the method 500 ends at operation 516, where an end-user may execute a customized business process through the business process client 108. For example, FIG. 5C is a flow diagram that shows a method 540 for executing a customized business process. In an example embodiment, the method 540 may be implemented by the components of the design-time platform 101, the run-time platform 103, or a combination thereof.

Referring to FIG. 5C, the method 540 may begin at operation 542. Then, at operation 544, a business process client 108 may identify the next task in the business process that is to be performed by the end-user. In an example embodiment, the business process client identifies the next task to be performed by communicatively connecting to the task manager 104. Once the business process client 108 is communicatively coupled, the business process client 108 may communicate end-user credentials (e.g., user name and password) and an identifier associated with the business process to the task manager 104. The task manager may use the end-user credentials and the identifier of the business process to determine the task that is to be completed next. Such a task may be associated with a task descriptor 106, which may include, among other things, identifiers associated with the UI definition, business object definition, business object, and a semantic configuration. The task manager 104 may then communicate the task descriptor 106 to the business process client 108 so that the business process client 108 may identify the elements that are used to perform the task.

Upon identifying the elements used to perform the task, the business process client 108 then receives a UI definition, business object definition, and business object data, as shown in FIG. 5C by operations 546, 548, and 550, respectively. In some embodiments, the operations 546, 548, and 550 may use the identifiers included in the task descriptor 106 to receive the respective definition or data. Further, the respective definitions and data may be received based on communications with the runtime server 136. In other embodiments, the respective definitions and data may be stored locally in the business process client 108. In such cases, the business process client 108 may utilize a modular communication technique where the business definition is communicated separately from the business object definition. Accordingly, the business object definition 140, for example, may be sent once, rather than each time the business object data 138 is communicated from the runtime server 136 to the business process client 108.

At operation 552, the business process client 108 receives a semantic configuration. In one embodiment, the task builder 110 searches a semantic configuration cache 113 using a configuration identifier received in the task descriptor 106. If a match is found, the task builder 110 uses the semantic configuration stored in the semantic configuration cache 113. Otherwise, the task builder 110 may obtain the semantic configuration from the runtime server 136.

As described above, in some embodiments, a semantic configuration may extend another semantic configuration. Accordingly, as shown in FIG. 4, the semantic configuration may form part of a semantic configuration hierarchy 400. In such situations, the semantic configuration identifier stored in the task descriptor 108 may identify a semantic configuration that extends another semantic configuration. As such, once the task builder 110 obtains a semantic configuration, the task builder 110 then determines whether the obtained semantic configuration extends a different semantic configuration. If so, then the task builder 110 obtains the different semantic configuration (e.g., from the semantic configuration cache or containers 120, 132). Because the different semantic configuration may also extend another semantic configuration, this process of obtaining extended semantic configurations may continue until the task builder 110 obtains a semantic configuration that does not extend from another semantic configuration.

With reference to FIG. 5C, the method 540 then customizes the task defined in the business process definition. For example, the method 540 may merge the UI definition, the business object data, and the business definition with the semantic configuration to form a task of a business process customized for the end-user. This is shown as operation 554. For example, the task builder 110 may assign terminology in the semantic configuration to specific UI elements, such as input fields, buttons, text boxes, or any other suitable UI control. As a further example, the semantic configuration may cause the task builder 110 to disable certain steps of the task, set default values, cause dependencies between UI elements, or any other suitable configuration of the business process. The method 540 then terminates at operation 556.

It is to be appreciated that a number of embodiments are possible. For example, in some embodiments, the identifiers associated with a task descriptor may include versioning information. Such versioning information may allow the usage of new versions of UI, business objects, or semantic configurations without changing the runtime-relevant components, e.g. business process client.

Embodiments may provide a number of technical advantages. For example, some embodiments may provide comparatively efficient processing of business operations. Such may be the case where a semantic configuration eliminates unnecessary tasks or steps, or where the semantic configuration sets default values that are used often.

As additional advantages, embodiments may reduce the data transferred between a client and a server. To illustrate, some embodiments may separate the semantic configuration from the UI definition, business object definition, or business process definition. In this way, embodiments may transfer the semantic configuration from the runtime server 136 when the semantic configuration cache 113 does not store a valid copy. Further data transfer savings may be realized in some embodiments when a semantic configuration extends another semantic configuration. For example, the runtime server 136 may communicate an extending semantic configuration but not an extended semantic configuration when the semantic configuration cache 113 already stores the extended semantic cache.

Still further, as described above, a semantic configuration may be used in some embodiments to alter a business process without having to alter a business process definition. Altering a business process through the semantic configuration may be useful because, in some embodiments, it may reduce the number of business process definitions which are developed, supported, and delivered by the business process provider. Additionally, using a semantic configuration allows the customers to easily adapt the business process to customer-specific requirements, e.g. disabling a step (e.g. wizard step) or task that is not used by the customer in a local implementation of the business process.

Figure 6:
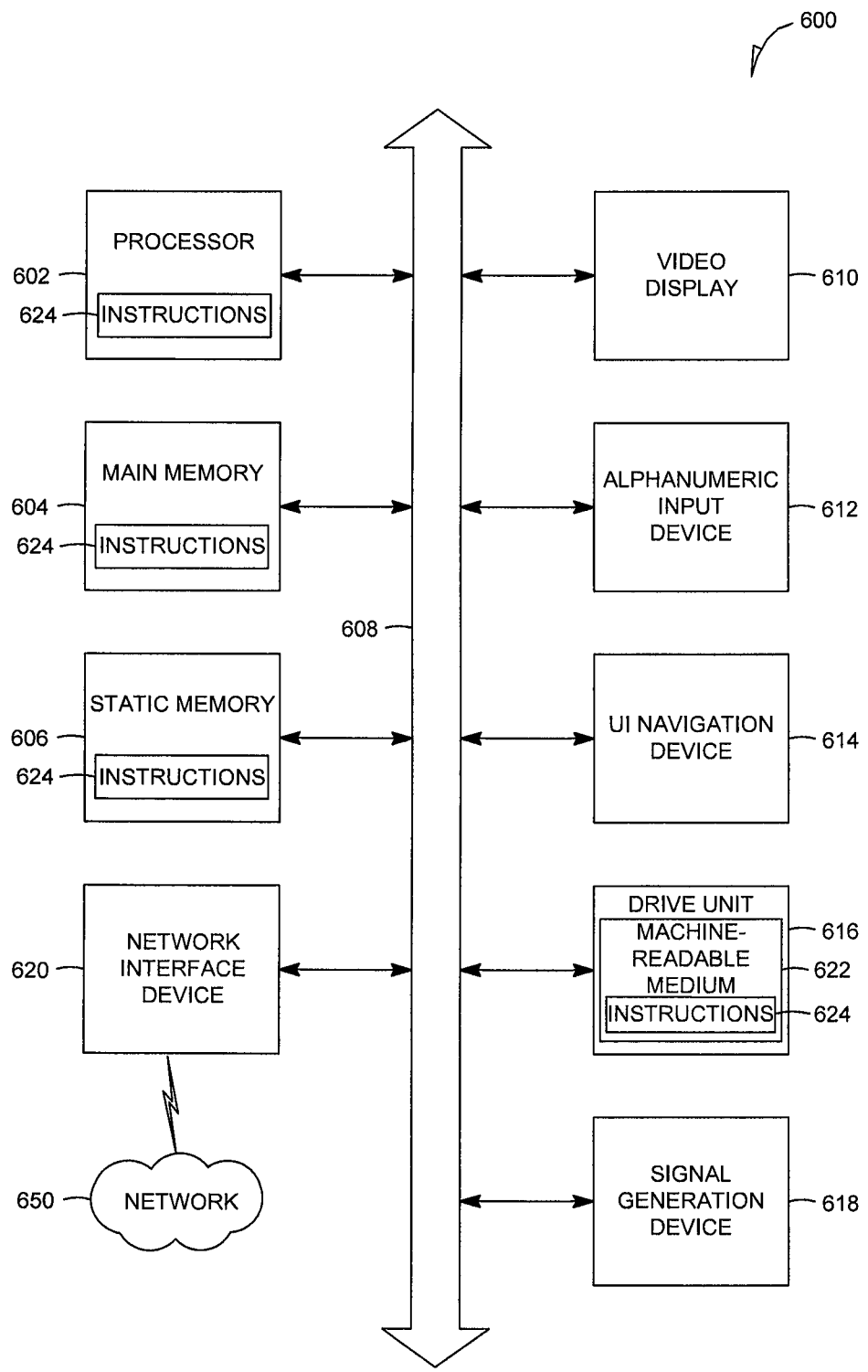
FIG. 6 depicts a block diagram of a machine in the example form of a computing device within which may be executed a set of instructions for causing the machine to perform any one or more of the methodologies discussed herein.

FIG. 6 depicts a block diagram of a machine in the example form of a computing device 600 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 600 includes a processor 602 (e.g., a central processing unit (CPU), a graphics processing unit (GPU) or both), a main memory 604 (e.g., random access memory), and static memory 606 (e.g., static random-access memory), which communicate with each other via bus 608. The computing device 600 may further include video display unit 610 (e.g., a plasma display, a liquid crystal display (LCD) or a cathode ray tube (CRT)). The computing device 600 also includes an alphanumeric input device 612 (e.g., a keyboard), a user interface (UI) navigation device 614 (e.g., a mouse), a disk drive unit 616, a signal generation device 618 (e.g., a speaker), and a network interface device 620.

The disk drive unit 616 (a type of non-volatile memory storage) includes a machine-readable medium 622 on which is stored one or more sets of data structures and instructions 624 (e.g., software) embodying or utilized by any one or more of the methodologies or functions described herein. The data structures and instructions 624 may also reside, completely or at least partially, within the main memory 604 and/or within the processor 602 during execution thereof by computing device 600, with the main memory 604 and processor 602 also constituting machine-readable, tangible media.

The data structures and instructions 624 may further be transmitted or received over a computer network 650 via network interface device 620 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 600) or one or more hardware modules of a computer system (e.g., a processor 602 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 602 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 602 configured using software, the general-purpose processor 602 may be configured as respective different hardware modules at different times. Software may accordingly configure a processor 602, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 602 that are temporarily configured (e.g., by software) or permanently configured to perform the relevant operations. Whether temporarily or permanently configured, such processors 602 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 602 or processor-implemented modules. The performance of certain of the operations may be distributed among the one or more processors 602, not only residing within a single machine, but deployed across a number of machines. In some example embodiments, the processors 602 may be located in a single location (e.g., within a home environment, an office environment or as a server farm), while in other embodiments the processors 602 may be distributed across a number of locations.

While the embodiment(s) is (are) described with reference to various implementations and exploitations, it will be understood that these embodiments are illustrative and that the scope of the embodiment(s) is not limited to them. In general, techniques for data searches using context information may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A computer-implemented method comprising:
    accessing a business process platform that includes a business process definition and a provider semantic configuration, the business process definition modeling a business process as a workflow comprising a plurality of dependent tasks, wherein the business process definition identifies a user interface definition, a business object definition, and business object data;
    generating a group semantic configuration that extends the provider semantic configuration;
    applying the group semantic configuration to one or more of the user interface definition, the business object definition, and the business object data; and
    customizing one of the plurality of dependent tasks of the workflow defined in the business process definition based on the group semantic configuration, the customization altering a meaning of at least one element of the customized dependent task, wherein the meaning of the customized dependent task comprises task functionality and behavior.

2. The method of claim 1, wherein the group semantic configuration personalizes the business process definition for a group within an organization.

3. The method of claim 1, wherein the group semantic configuration further extends a customer semantic configuration that personalizes the business process definition for an organization.

4. The method of claim 1, wherein the business process definition includes a task descriptor that identifies the user interface definition, the business object definition, and the business object data.

5. The method of claim 1, wherein the customization of one of the plurality of dependent tasks comprises:
    receiving the user interface definition;
    receiving the business object definition;
    receiving the business object data; and
    applying the group semantic configuration to the user interface definition, the business object definition, and the business object data, and
    wherein the provider semantic configuration is generated by the business process provider as a ready to use semantic configuration, and the group semantic configuration is generated by the business process provider as a customized business process for a group within an organization customer.

6. The method of claim 5, wherein the provider semantic configuration is stored in an extensible markup language (XML) format.

7. The method of claim 1, further comprising assigning a customer semantic configuration to an instance of the business process definition.

8. The method of claim 1, wherein the group semantic configuration includes semantic values that are usable to assign terminology to user interface controls defined in the user interface definition of the business process definition.

9. A non-transitory, machine-readable medium that stores instructions, which, when performed by a machine, cause the machine to perform operations comprising:
   access a business process platform that includes a business process definition and a provider semantic configuration, the business process definition modeling a business process as a workflow comprising a plurality of dependent tasks, wherein the business process definition identifies a user interface definition, a business object definition, and business object data;
   generate a group semantic configuration that extends the provider semantic configuration; and
   apply the group semantic configuration to one or more of the user interface definition, the business object definition, and the business object data;
   customize one of the plurality of dependent tasks of the workflow defined in the business process definition based on the group semantic configuration, the customization altering a meaning of at least one element of the customized dependent task, wherein the meaning of the customized dependent task comprises task functionality and behavior.

10. The non-transitory, machine-readable medium of claim 9, wherein the group semantic configuration personalizes the business process definition for a group within an organization.

11. The non-transitory, machine-readable medium of claim 9, wherein the group semantic configuration further extends a customer semantic configuration that personalizes the business process definition for an organization.

12. The non-transitory, machine-readable medium of claim 9, wherein the business process definition includes a task descriptor that identifies the user interface definition, the business object definition, and the business object data.

13. The non-transitory, machine-readable medium of claim 9, wherein the customization of one of the plurality of dependent tasks comprises:
   receiving the user interface definition;
   receiving the business object definition;
   receiving the business object data; and
   applying the group semantic configuration to the user interface definition, the business object definition, and the business object data, and
   wherein the provider semantic configuration is generated by the business process provider as a ready to use semantic configuration, and the group semantic configuration is generated by the business process provider as a customized business process for a group within an organization customer.

14. The non-transitory, machine-readable medium of claim 9, further comprising assigning a customer semantic configuration to an instance of the business process definition.

15. The non-transitory, machine-readable medium of claim 9, wherein the group semantic configuration includes semantic values that are usable to assign terminology to user interface controls defined in the user interface definition of the business process definition.

16. An apparatus comprising:
   a non-transitory, machine-readable medium;
   a processor coupled to the non-transitory, machine-readable medium, the non-transitory, computer-readable storage medium comprising code executable by the processor for implementing a method comprising:
      accessing a business process platform that includes a business process definition and a provider semantic configuration, the business process definition modeling a business process as a workflow comprising a plurality of dependent tasks, wherein the business process definition identifies a user interface definition, a business object definition, and business object data;
      generating a group semantic configuration that extends the provider semantic configuration;
      applying the group semantic configuration to one or more of the user interface definition, the business object definition, and the business object data; and
      customizing one of the plurality of dependent tasks of the workflow defined in the business process definition based on the group semantic configuration, the customization altering a meaning of at least one element of the customized dependent task, wherein the meaning of the customized dependent task comprises task functionality and behavior.

17. The apparatus of claim 16, wherein the group semantic configuration personalizes the business process definition for a group within an organization.

18. The apparatus of claim 16, wherein the group semantic configuration further extends a customer semantic configuration that personalizes the business process definition for an organization.

19. The apparatus of claim 16, wherein the business process definition includes a task descriptor that identifies the user interface definition, the business object definition, and the business object data.

20. The apparatus of claim 16, wherein the customization of one of the plurality of dependent tasks comprises:
   receiving the user interface definition;
   receiving the business object definition;
   receiving the business object data; and
   applying the group semantic configuration to the user interface definition, the business object definition, and the business object data, and
   wherein the provider semantic configuration is generated by the business process provider as a ready to use semantic configuration, and the group semantic configuration is generated by the business process provider as a customized business process for a group within an organization customer.

21. The apparatus of claim 16, wherein the group semantic configuration includes semantic values that are usable to assign terminology to user interface controls defined in the user interface definition of the business process definition.

* * * * *